(12) United States Patent
Short et al.

(10) Patent No.: US 7,918,426 B2
(45) Date of Patent: Apr. 5, 2011

(54) ADJUSTABLE MOUNT

(75) Inventors: Mark Short, West Midlands (GB); Kenneth Gary Nicholls, West Midlands (GB); Raymond Worrall, West Midlands (GB)

(73) Assignee: AVF Group Limited, Telford, Shropshire (GB)

( * ) Notice: Subject to any disclaimer, the term of this patent is extended or adjusted under 35 U.S.C. 154(b) by 672 days.

(21) Appl. No.: 11/506,526

(22) Filed: Aug. 17, 2006

(65) Prior Publication Data

US 2007/0041213 A1    Feb. 22, 2007

(30) Foreign Application Priority Data

Aug. 18, 2005  (GB) .................................. 0516913.1
Aug. 18, 2005  (GB) .................................. 0516914.9

(51) Int. Cl.
*E04G 3/00*  (2006.01)
(52) U.S. Cl. ................ 248/276.1; 248/225.11; 248/495; 248/919; 248/923; 361/679.22
(58) Field of Classification Search ................... 248/121, 248/225.21, 224.8, 225.11, 919, 923, 284.1, 248/371, 276.1, 495; 361/679.02, 679.22, 361/679.58
See application file for complete search history.

(56) References Cited

U.S. PATENT DOCUMENTS

| | | | | |
|---|---|---|---|---|
| 2,509,424 | A | * | 5/1950 | Denton .......................... 248/495 |
| 2,791,388 | A | * | 5/1957 | Hirt ............................... 248/495 |
| 2,965,339 | A | | 12/1960 | Denton |
| 3,155,358 | A | | 11/1964 | Carlson |
| D218,016 | S | | 7/1970 | Hobrebe ........................ D8/363 |
| 4,148,453 | A | * | 4/1979 | Brantly ......................... 248/660 |
| 4,441,432 | A | | 4/1984 | Carlton |
| D349,640 | S | | 8/1994 | Whitaker ....................... D8/363 |
| D352,652 | S | | 11/1994 | Vogels ............................ D8/363 |
| 5,372,347 | A | | 12/1994 | Minnich |
| D406,228 | S | | 3/1999 | Vogels ............................ D8/363 |
| D411,098 | S | | 6/1999 | Vogels ............................ D8/363 |
| 5,941,497 | A | | 8/1999 | Inoue et al. |
| 6,279,257 | B1 | | 8/2001 | Lemire |
| 6,402,109 | B1 | | 6/2002 | Dittmer |
| 6,554,242 | B2 | * | 4/2003 | Kim ............................... 248/371 |
| 6,604,722 | B1 | * | 8/2003 | Tan ............................... 248/276.1 |
| D488,708 | S | | 4/2004 | Lam et al. ..................... D8/363 |
| 6,905,101 | B1 | | 6/2005 | Dittmer |

(Continued)

FOREIGN PATENT DOCUMENTS

| | | |
|---|---|---|
| CA | 2512685 A1 | 1/2004 |
| CA | 2475237 A1 | 1/2006 |
| EP | 1618329 A2 | 1/2006 |

(Continued)

OTHER PUBLICATIONS

GB Search Report; Appl. No. GB0616381.0; date of Search Dec. 14, 2006; 1 pp.

(Continued)

*Primary Examiner* — Anita M King
(74) *Attorney, Agent, or Firm* — Wells St. John, P.S.

(57) ABSTRACT

An adjustable mount for mounting a flat panel display screen on a support comprises a first component adapted for securement to the support and forming a rear of the mount, a second component engaged with the first component and forming a front of the mount to which the screen is intended to be secured, in use, and an adjustment device acting between the first and second components to alter the relative positioning therebetween.

19 Claims, 3 Drawing Sheets

U.S. PATENT DOCUMENTS

| | | | |
|---|---|---|---|
| 7,070,156 B2 * | 7/2006 | Liao | 248/466 |
| 7,152,836 B2 | 12/2006 | Pfister et al. | |
| 7,178,775 B2 | 2/2007 | Pfister et al. | |
| 7,300,029 B2 * | 11/2007 | Petrick et al. | 248/285.1 |
| 7,316,379 B1 * | 1/2008 | Graham | 248/298.1 |
| 7,334,765 B2 * | 2/2008 | Hwang | 248/284.1 |
| 7,438,269 B2 | 10/2008 | Pfister et al. | |
| 7,513,474 B2 | 4/2009 | Anderson et al. | |
| 7,641,163 B2 | 1/2010 | O'Keefe | |
| 2002/0179801 A1 | 12/2002 | Kim | |
| 2004/0118987 A1 | 6/2004 | Matko et al. | |
| 2004/0245420 A1 | 12/2004 | Pfister et al. | |
| 2005/0092873 A1 | 5/2005 | Lin | |
| 2005/0133678 A1 | 6/2005 | Dittmer | |
| 2005/0263659 A1 | 12/2005 | Pfister et al. | |
| 2006/0226326 A1 | 10/2006 | Asamarai et al. | |
| 2007/0041150 A1 | 2/2007 | Short | |
| 2007/0176067 A1 | 8/2007 | Monaco | |
| 2007/0194196 A1 | 8/2007 | Pfister et al. | |
| 2008/0192418 A1 | 8/2008 | Zambelli et al. | |
| 2008/0315049 A1 | 12/2008 | Bailo et al. | |

FOREIGN PATENT DOCUMENTS

| | | |
|---|---|---|
| EP | 1812745 A1 | 8/2007 |
| EP | 06254344.2-1252 | 4/2010 |
| GB | 0516913.1 | 8/2005 |
| GB | 0516914.9 | 8/2005 |
| GB | 2414173 | 11/2005 |
| GB | 2414173 A | 11/2005 |
| GB | 0616381.0 | 4/2010 |
| JP | 2006526163 | 11/2006 |
| JP | 2007102247 | 4/2007 |
| WO | WO 2004/061359 A1 | 7/2004 |
| WO | WO2004/061359 A2 | 7/2004 |
| WO | WO 2004/063619 A2 | 7/2004 |
| WO | WO 2006/044969 A1 | 4/2006 |

OTHER PUBLICATIONS

European Search Report for Application No. 06254364.0-1252; mailed Jul. 17, 2007; 7 pp.

Extended European Search Report for EP Application No. 06254344. 2; mailed Aug. 7, 2007; 7 pp.

EP06254344.2-1252, Feb. 24, 2010, Office Action.

* cited by examiner

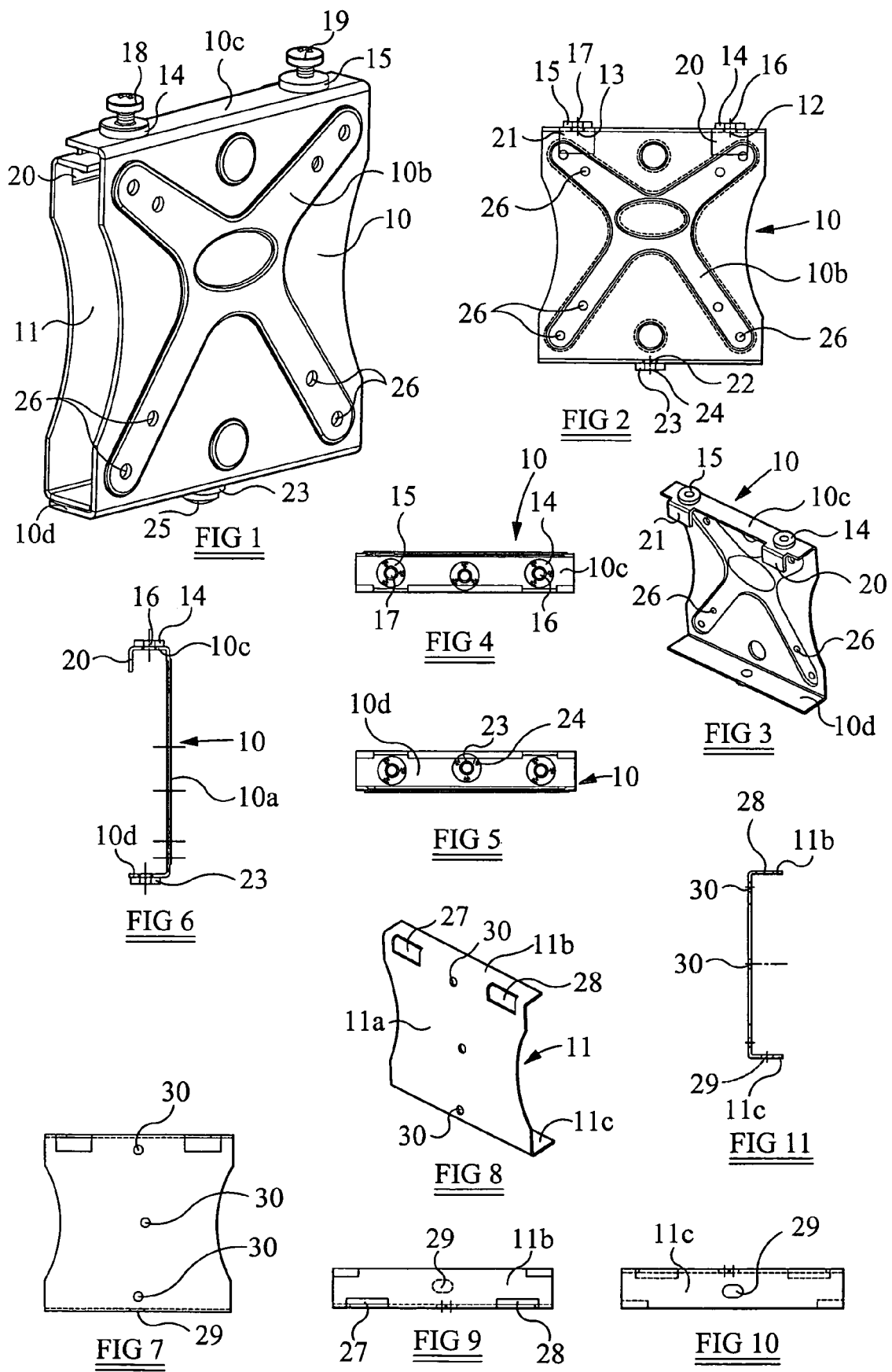

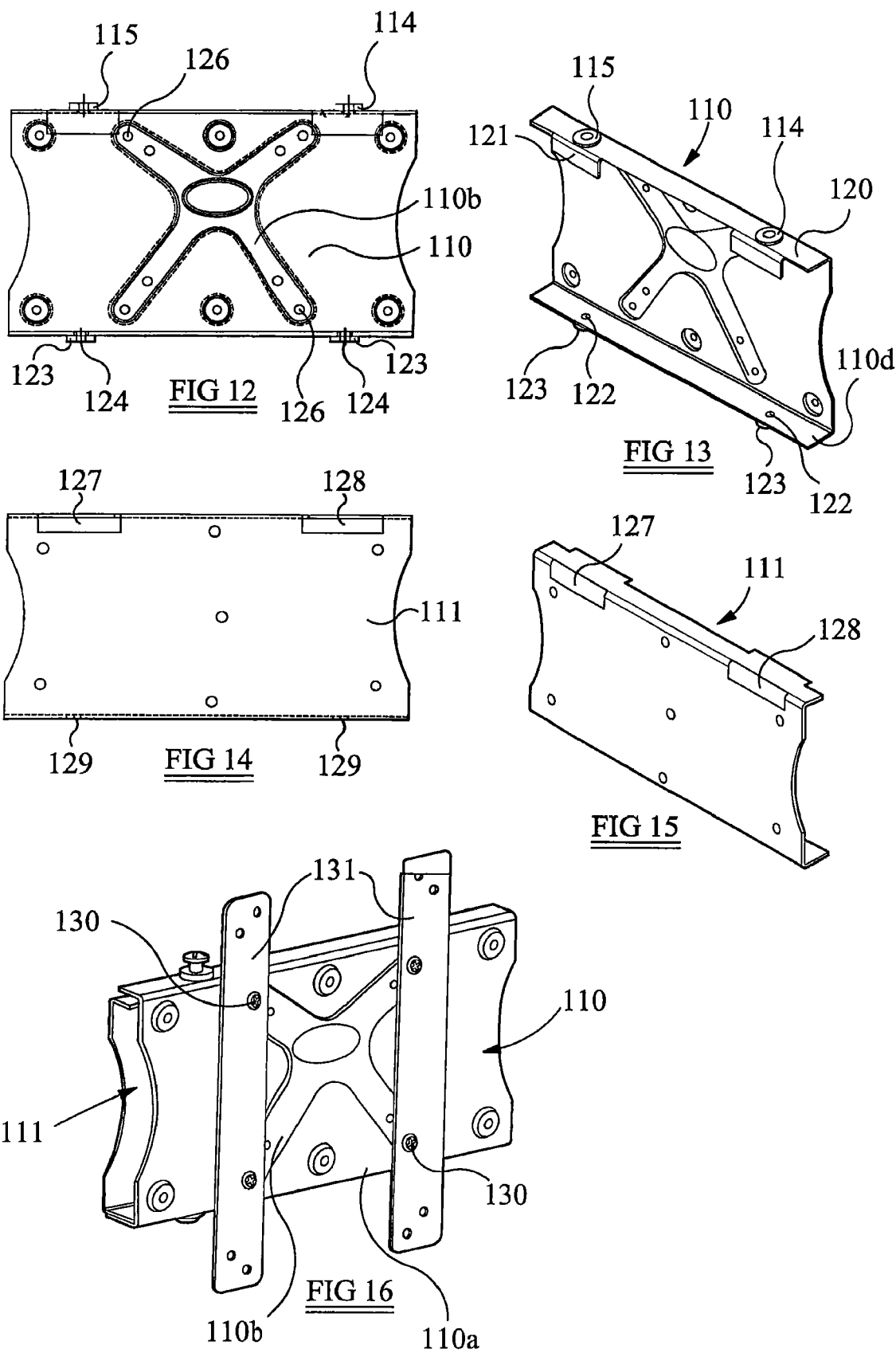

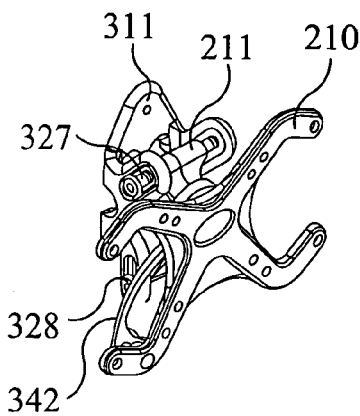
FIG 17
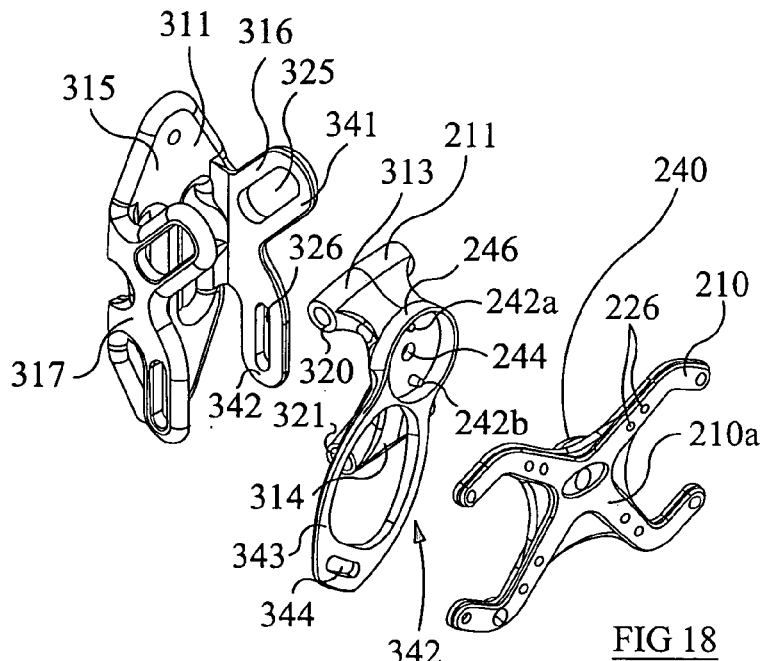
FIG 18
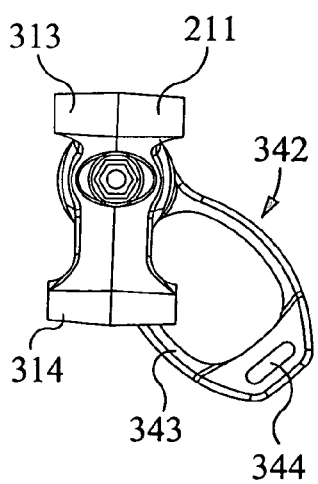
FIG 19
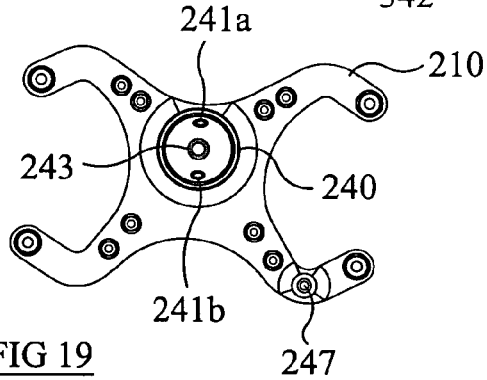
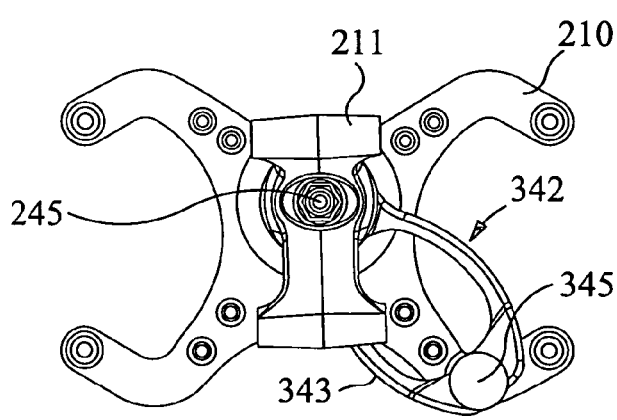
FIG 20
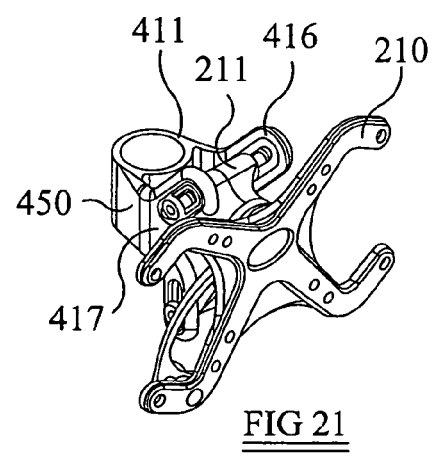
FIG 21

ADJUSTABLE MOUNT

CROSS REFERENCE TO RELATED APPLICATION

This application relates to and claims priority to corresponding Great Britain Patent Application No. 0516914.9, which was filed on Aug. 18, 2005, and which is incorporated by reference herein.

BACKGROUND OF THE DISCLOSURE

This invention relates to an adjustable mount for a flat panel screen, such as an LCD screen, and has particular application to the mounting of a liquid crystal television set to a vertical wall or equivalent surface.

A problem which has been encountered with the mounting of such a liquid crystal television set is ensuring that the set is level, i.e. that its upper longer surface is horizontal. Although care may be taken to secure the TV mount accurately to the wall or equivalent surface, it can still occur that when the TV set is secured to the mount using pre-formed fixing points thereof, it is tilted to the horizontal, with there being no means of adjustment.

One aspect of the disclosure provides an adjustable mount for a flat panel screen, such as an LCD screen, which overcomes the above-mentioned problem.

SUMMARY OF THE DISCLOSURE

According to the invention there is provided an adjustable mount for mounting a flat panel display screen on a support comprising a first component adapted for securement to said support and forming a rear of the mount, a second component engaged with the first component and forming a front of the mount to which the screen is intended to be secured, in use, and adjustment means acting between the first and second components to alter the relative positioning therebetween.

Preferably, the adjustment means is configured for adjusting the roll of a flat panel display when provided on the mount. The term roll being used herein to denote movement about a horizontal axis, as is commonly understood by the term roll when describing degrees of freedom, the other degrees of freedom being pitch and yaw.

In one embodiment the adjustment means is at least one screw engaged with a complementary screw thread of one of the components and having its shank abutting or capable of abutting the other of the components, so that rotation of the at least one screw can alter the relative horizontal positioning between the components in use. Desirably a pair of screws are threadedly engaged in the second component and can each be rotated in one direction so that the end of the screw shank engages the first component to alter the tilt of the second component relative to the first component fixed to said surface, in use, in a generally vertical plane. In a particular embodiment, the first component has at least one upper slot therein, in which is received respectively at least one hook of the second component to effect said engagement of the two components. The or each slot is longer than the hook received therein to allow for the relative tilting adjustment of the second component to the first component. The first component is sized to fit within the second component.

In another embodiment, the adjustment means comprises at least one screw engaged through a generally vertically extending slot in the first component and into a complementary screw thread on the second component, such that roll of the mounting component and thereby the display can be adjusted by movement of the screw along the slot.

Advantageously, in any of the above embodiments, locking means is provided for locking together the two components against relative tilting in a horizontal plane. Conveniently the locking means comprises at least one screw engaged with the second component having its shank received in a slot of the first component.

BRIEF DESCRIPTION OF THE DRAWINGS

The invention will now be described, by way of example, with reference to the accompanying drawings, in which:

FIG. 1 is a front perspective view of a first embodiment of an adjustable mount of the invention, FIG. 2 is a rear view of a front plate of the mount of FIG. 1, to a reduced scale, FIG. 3 is a rear perspective view of the front plate shown in FIG. 2, FIGS. 4 to 6 are respectively a top plan view, an underneath plan view and a side view of the front plate of FIGS. 2 and 3, FIG. 7 is a rear view of a wall plate of the mount of FIG. 1, to a reduced scale, FIG. 8 is a rear perspective view of the wall plate of FIG. 7, FIGS. 9 to 11 are respectively a top plan view, an underneath plan view and a side view of the wall plate of FIGS. 7 and 8, FIGS. 12 and 13 are respectively a front view and a rear perspective view of a front plate of a second embodiment of a mount of the invention, FIGS. 14 and 15 are respectively a rear view and a rear perspective view of a wall plate of said second embodiment of a mount of the invention, FIG. 16 is a front perspective view of a third embodiment of a mount of the invention, FIG. 17 is a front perspective view of a fourth embodiment of a mount of the invention, FIG. 18 is an exploded view corresponding to FIG. 17, FIG. 19 is a rear view of a first and a second component of the mount shown in FIGS. 17 and 18, FIG. 20 is a rear view of the first and second components of FIG. 19 when coupled together, and FIG. 21 is a front perspective view of the first and second components of FIG. 20 coupled to a component configured for mounting on a supporting arm.

DETAILED DESCRIPTION OF THE DISCLOSURE

The mount shown in the Figures is principally intended for mounting a liquid crystal television set to a support such as a vertical surface of a wall. However instead of a liquid crystal television set, the mount could also be used with flat panel display screens in general, thus including computer monitors.

The adjustable mount shown in FIG. 1 is basically formed by two components, namely a front plate 10 and a wall plate 11, each plate preferably being formed as a mild steel pressing.

The front plate 10 shown in detail in FIGS. 2 to 6, has a front part 10a of generally square shape, the front part being generally flat but having pressed or stamped out of it, in this example, a logo 10b generally in the form of a stylised X. At opposite upper and lower parallel sides of the front part 10a are formed integral rectangular flanges 10c, 10d, extending at 90° from the front part 10a and at the same side thereof. The flanges generally extend from the front part 10a each for the same distance.

The upper flange 10c is provided adjacent its respective opposite ends with circular openings 12, 13. At the upper face of the flange 10c respective circular bosses 14, 15 are secured over the openings 12, 13, with respective internally threaded circular openings 16, 17 being co-axial with the larger circular openings 12, 13, therebelow. As shown in FIG. 1, respective screws 18, 19 are engaged in the threaded openings 16, 17 respectively for a purpose to be described hereinafter.

At the free longitudinal side of the flange 10c, at respective positions aligned with the respective bosses 14, 15 are integral downwardly depending hooks 20, 21, each hook being of generally rectangular form and being at 90° to the flange 10c, so as to lie parallel to the front part 10a of the front plate 10. The depth of each hook is, in this example, slightly less than the width of the flange 10c.

At the centre of the lower flange 10d there is a circular opening 22 over which at the outer surface of the flange 10d is a circular boss 23 which, like the bosses 14 and 15 has an internally threaded circular opening 24 therethrough, this opening being co-axial with the larger diameter opening 22 in the flange 10d. Accordingly as for the bosses 14, 15, the boss 23 can receive a screw 25, for a purpose to be referred to hereinafter.

The front plate 10 is provided with various fixing openings 26 extending therethrough, and in the example illustrated four pairs of such openings are provided in the respective legs of the stylised X which forms the logo 10b. It will be understood that the rear of the panel to be secured to the front plate 10 would generally have a preset arrangement of fixing openings to correspond to at least some of the fixing openings 26.

The wall plate 11 is of similar form to the front plate 10, having a flat front part 11a from which extends at the same side therefrom, at right angles thereto, respective upper and lower flanges 11b and 11c. A pair of longitudinally spaced apart rectangular slots 27, 28, are formed at the upper end of the part 11a, each slot commencing substantially at the junction between the front part 11a and the upper flange 11b, and extending a short way down into the front part 11a, as best shown in FIGS. 7 and 8. These slots are to receive the hooks 20, 21 respectively, but are oversized relatively thereto, so that there is a clearance at the respective opposite sides of each hook from its associated slot, and additionally there may be a clearance at the longitudinal free end of each hook even when the wall plate 11 is at its uppermost position in the front plate 10 as will be described. To this end it should be noted that, as shown in FIG. 1, the wall plate 11 is proportionately smaller than the front plate 10 so that, as shown in that Figure, it can be substantially received therein with its upper flange 11b below the flange 10c and its lower flange 11c above the flange 10d.

An elongated slot 29 is provided in the lower flange 11c midway between its ends, the positioning of this slot being such that, when the front plate and the wall plate are assembled together as shown in FIG. 1, the shank of the screw 25, when the screw is tightened, will extend into this slot 29 and thereby prevent the front plate and the wall plate swinging apart. Finally with regard to the wall plate 11, it will be noted that it is provided with three generally vertically spaced fixing openings 30 generally centrally in its front part 11a, these openings 30 being to allow the plate 11 to be fixed to a wall or equivalent surface.

From the description above, it will be understood that with all the screws 18, 19 and 25 unscrewed to their respective outermost positions engaged in their respective bosses, it is possible to engage together the front plate 10 with the wall plate 11 by presenting the front plate 10 substantially at 90° to the wall plate 11 and manipulating it so that the hooks 20, 21 are received in the respective slots 27, 28 of the wall plate 11 and then swinging the front plate 10 in a pivoting motion to the position shown in FIG. 1 where the front part 10a of the front plate 10 is substantially parallel to the front part 11a of the wall plate 11. Before the pivoting takes place, the wall plate 11 is secured to a wall or equivalent surface so that it is vertical. When a television or other flat panel is then secured to the front plate 10 using the fixing openings 26, the weight of the panel/television will bring the front plate 10 vertically downwards so that the underside of its upper flange 10c will bear on the upper surface of the upper flange 11b of the wall plate 11, given that the screws 18 and 19 do not project beyond the lower surface of the flange 10c.

If, in the position now described, the panel or television is correctly mounted, i.e. with its upper longitudinal surface horizontal, then no adjustment of the mount is required. However if the upper surface of the panel or television is not horizontal, it is possible to adjust the mount so that this surface becomes horizontal. This adjustment is by way of adjusting one of the screws 18 and 19, so as, in a sense, to tilt the front plate 10 relative to the fixed wall plate 11 in a vertical plane so that the upper surface of the object mounted moves to become horizontal. It will be understood that the free end of the shank of the screw 18 or 19 which is adjusted bears against the upper surface of the flange 11b of the wall plate so as effectively to 'push' the front plate upwards and it can be seen that this produces a slight pivoting movement about the point of engagement of the shank of the other screw on the flange 11b. During this adjustment the screw 25 will have been tightened so that its shank is received in the elongated slot 29, and the elongation of that slot enables the tilting/adjustment movement described to take place, in that it allows for the pivoting of the front plate relative to the wall plate even though they are secured together against pivoting about the hooks 20, 21 and slots 27, 28 by virtue of the screw 25 which effectively locks the two plates together. The tilting adjustment provided by screws 18, 19 depending upon which way the tilt is to be adjusted, is facilitated by the relatively loose fit of the hooks 20, 21 in the oversized slots 27, 28.

In an alternative arrangement it may be possible to provide adjustment by means of a single screw instead of the two screws 18, 19, and in particular the arrangement could be used if the surface in question is below horizontal and it is required to 'jack' it up to the horizontal position. The disadvantage with the single screw is that it is generally only possible to adjust in one direction, whereas with the two screws shown in FIG. 1, adjustment can be made from above or below horizontal.

In a further alternative arrangement, the adjustment means could be provided so that the equivalent of the screws 18 and 19, or indeed of a single screw, is provided at the bottom of the mount.

Whilst the pivot between the front plate 10 and the wall plate 11 is, in the example illustrated by way of the hooks 20, 21 and slots 27, 28, there could instead be a loose pivot pin arranged in sliding engagement between the two parts.

Although the example shown in provided with a single slot 29 and screw 25 coupling between the front plate 10 and the back plate 11, multiple slots with respective screws may be employed. Thus, slots may be provided at intervals along the length or width of flange 11c.

In a still further embodiment, the lower flange 11c of the wall plate could be provided with a forwards extension, either as a separate part or integrally, to provide one or more further slots 29 forwardly of the slot 29 shown so that the two plates 10 and 11 could be locked together with the parts 10a and 11a at an angle to one another rather than being parallel as shown in FIG. 1, i.e. with the front plate tilted relatively to the wall plate 11 so as to incline the panel or screen carried by the front plate 10.

FIGS. 12 to 15 show an alternative embodiment of a mount of the invention, this alternative form of mount however being wider to accommodate a larger panel. Structurally, however, both the front plate and the wall plate are substantially identical to the components 10 and 11 respectively and parts corresponding to the front plate 10 and wall plate 11 of the first embodiment are thus for convenience shown with the same reference numerals but with the prefix 100. Accordingly it will be seen from FIGS. 12 to 15 that the only significant difference apart from the increased spacing apart of the bosses 114, 115, hooks 120, 121 and slots 127, 128 is that instead of there being a single boss at the underside of the lower flange of the front plate 110 there are now two spaced apart bosses 123, each with an internally screw threaded circular opening 124 therethrough in alignment with a larger circular opening 122 in the flange 110d. Correspondingly the lower flange of the wall plate 111 is provided with two spaced apart elongated slots 129 as shown in FIG. 14, so that the shanks of respective screws engaged in the threaded bosses 123 can be received in the elongated slots 129 to lock together the front plate and the wall plate against pivotal movement between the two components about the connection of the hooks of the front plate in the slots of the wall plate, in the same manner as described in the first embodiment.

In the still further embodiment of the mount shown in FIG. 16, the front plate 110 and wall plate 111 are of the form shown in FIGS. 12 to 15. However with this embodiment a pair of spaced parallel mild steel adaptor plates 131 are secured by screws to the outwardly facing surface of the front part 110a of the front plate 110 in order to provide fixing openings for a larger panel or screen, each adaptor plate being secured to the front plate 110 by suitable fixings 130 in the openings in the logo 110b.

FIGS. 17 through 20 show a yet further embodiment of a mount according to the present invention. Since some of the component parts have similar functions to those of the first embodiment in FIGS. 1 through 11, identical reference numerals will be used where appropriate with the prefix 200. It will be noted that in this embodiment the front pressed plate 10 of the first embodiment has been replaced with a front plate 210 of a cast skeleton design. The front plate 210 is of a substantially planar X-shape and includes means, in the form of screw holes 226, for securing a flat panel display to its front surface 210a. The rear of the front plate 210 is configured for engagement with a rear component 211 of the adjustable mount. As can be seen from FIGS. 18 and 19, the rear of the front plate 210 includes an annular projecting element 240 disposed just above the center of the X. Within the diameter of the annular element 240 are provided upper and lower slots 241a, 241b, respectively, which are configured to receive complementary projections 242a, 242b of the rear component 211, described below. The slots 241a and 241b are configured such that a certain degree of relative rotation of the front plate 210 with respect to the rear component 211 is permitted. The degree of relative rotation being defined by the length of the slots 241a, 241b in which the projections 242a, 242b are free to travel. A hole 243 is provided in the front plate 210, centrally of the annular element 240. The hole 243 is configured to align with a complementary hole 244 on the rear component 211, as described below. A pivot shaft 245 is disposed through the respective holes 243 and 244 in order to provide an axis for rotation of the front plate 210 with respect to the rear component 211. At least one end of the pivot shaft 245 is threaded to allow attachment of a nut (not shown) to secure the front plate 210 and rear component 211 together. A spacer may be provided to ensure that the nut is not over tightened to thereby hinder the desired rotation. Also provided on the rear of the front plate 210, adjacent to an extreme end of a lower leg of the X, is a screw-threaded hole 247. The hole 247 allows for horizontal leveling of the front plate 210 as will be described below.

The rear component 211 is a cast tilt component with a pair of vertically spaced arms 313 and 314. The upper arm 313 carries a first pivot 320 and the lower arm 314 carries a second pivot 321. The pivots 320, 321 are configured for engagement with a further component 311 configured for attaching the mount to a supporting vertical surface. The further component 311 has a pair of spaced parallel sides 316 and 317, each of which includes respective first and second elongate slots 325, 326. Each side of the further component 311 is configured with respective vertically spaced arms 341 and 342 for accommodating the upper and lower elongate slots 325, 326. The slots 325 and 326 are orientated with the upper slots 325 being directed upwardly and forwardly of the further component 311 and the lower slots 326 being vertical. A base 315 connects the sides 316 and 317. The base 315 is configured for mounting on a vertical support surface. The first and second pivots 320, 321 each comprise pivot pins 327 and 328. An upper one of the pivots 320 has its pin 327 extending through respective openings in the upper arm 313 of the rear component 211 and into said upper slots 325 in the upper side arms 341 of the further component 311 for sliding therealong, whilst the lower one of the pivots 321 has its pin 328 extending through respective openings in the lower arm 314 of the rear component 211 and into the lower slots 326 in the lower side arms 342 of the further component 311 for sliding therealong. Through the above arrangement the rear component 211 may be tilted with respect to the further component 311. This tilting mechanism forms the subject of the Applicant's co-pending UK patent application number GB0516913.1.

The front of the rear component 211 includes a substantially annular projecting element 246. The annular element 246 is of a diameter slightly larger than that of the annular element 240 on the rear of the front plate 210. Thus, when assembled, the annular element 240 of the front plate 210 is received within the annular element 246 of the rear component 211. In this arrangement, projections 242a, 242b provided on the rear component 211, within the annular element 246 are received in the slots 241a, 241b of the front plate 210. A hole 244 is provided in the rear component 211, centrally of the annular element 246, to receive the pivot shaft 245 as described above.

Depending downwardly from the edge of the annular element 246, at an angle from the vertical, is a means 342 for adjusting the roll or tilt of a flat panel display when provided on the front plate 210. The means 342 comprises a substantially oval shaped support 343 with an open center. An angled slot 344 is provided in the oval flat panel display when provided on the front plate 210. The means 342 support 343, close to its furthest point from the annular element 246. In use, a screw 345 is engaged through the slot 344 and into the screw threaded hole 247 on the front plate 210. Roll, for example to effect horizontal leveling of a mounted flat panel display, is permitted by movement of the screw 345 along the slot 344. Subsequent tightening of the screw 345 fixes the front plate 210 in the desired horizontal position.

In an alternative arrangement, the tilting and levelling mechanism of FIGS. 17 to 20 is configured for mounting on a supporting arm rather than a vertical surface. In this case, the further component 411 may be configured for pivotal engagement with the supporting arm and may include a cylindrical tube 450, as shown in FIG. 21. The cylindrical tube 450 connects sides 416 and 417 of the further component 411 and effectively replaces the base 315 in FIGS. 17 and 18. All other components in FIG. 21 are identical to those of FIGS. 17 to 20.

The invention claimed is:

1. An adjustable mount for mounting a flat panel display screen on a support comprising a first component adapted for securement to said support and forming a rear of the mount, a second component engaged with the first component and forming a front of the mount to which the screen is intended to be secured, in use, and an adjustment device coupled with the first and second components and configured to alter the relative positioning therebetween;

wherein the adjustment device comprises a pair of screws, wherein each of the pair of screws is engaged with a complementary screw thread of one of the components and having its shank abutting or capable of abutting the other of the components, so that rotation of each of the pair of screws can alter the roll of the flat panel display screen to provide horizontal leveling of the flat panel display screen when provided on the mount; and wherein the mount further comprises a locking device which is independent of the adjustment device and which is configured to secure the first and second components together while allowing for their relative positions to be altered by the adjustment device.

2. An adjustable mount according to claim 1 wherein the pair of screws are threadedly engaged in the second component and can each be rotated in one direction so that the end of the screw shank engages the first component to alter the tilt of the second component relative to the first component fixed to said surface, in use, in a generally vertical plane.

3. An adjustable mount according to claim 1 wherein the first component has at least one upper slot therein, in which is received respectively at least one hook of the second component to effect said engagement of the two components, the slot being longer than the hook received therein to allow for the relative tilting adjustment of the second component to the first component.

4. An adjustable mount according to claim 1 wherein the first component is sized to fit within the second component.

5. An adjustable mount according to claim 1 wherein each of the screws is engaged through a generally vertically extending slot in the first component and into the complementary screw thread on the second component, such that roll of the mounting component and thereby the display can be adjusted by movement of the screw along the slot.

6. An adjustable mount according to claim 1 wherein the adjustment device is configured, in use by a user, to level the display so that an upper surface of display is substantially horizontal.

7. An adjustable mount according to claim 1 wherein the adjustment device is configured to level the display so that an upper surface of the display is substantially horizontal while an upper surface of the first component is not horizontal.

8. An adjustable mount according to claim 1 wherein the adjustment device is configured to provide the horizontal leveling by adjusting the roll of the flat panel display screen about an axis which is substantially perpendicular to and substantially centered within the flat panel display screen.

9. An adjustable mount according to claim 1, wherein the locking device is configured to prevent the first and second components swinging apart.

10. An adjustable mount according to claim 9 wherein the locking device is provided for locking together the two components against relative tilting in a horizontal plane.

11. An adjustable mount according to claim 10 wherein the locking device comprises at least one screw engaged with the second component having its shank received in a slot of the first component.

12. An adjustable mount according to claim 11 wherein the slot is elongated such that it enables adjustment of the relative positioning of the first and second components while said first and second components are secured together by the at least one screw of the locking device.

13. An adjustable mount according to claim 9 wherein the locking device is configured to lock the relative positioning between the first and second components.

14. An adjustable mount according to claim 13 wherein the locking device is configured to lock the relative positioning between the first and second components in one of a plurality of possible relationships with respect to one another and throughout an entirety of a range of the relative positioning as selected by a user.

15. An adjustable mount for mounting a flat panel display screen on a support comprising a first component adapted for securement to said support and forming a rear of the mount, a second component engaged with the first component and forming a front of the mount to which the screen is intended to be secured, in use, and an adjustment device coupled with the first and second components and configured to alter the relative positioning therebetween;

wherein the adjustment device comprises at least one screw engaged with a complementary screw thread of one of the components and having its shank abutting or capable of abutting the other of the components, so that rotation of the at least one screw can alter the relative horizontal positioning between the components in use; and wherein the first component has at least one upper slot therein, in which is received respectively at least one hook of the second component to effect said engagement of the two components, the slot being longer than the hook received therein to allow for the relative tilting adjustment of the second component to the first component.

16. An adjustable mount according to claim 1 wherein the adjustment device is configured to provide the horizontal leveling by adjusting the roll of the flat panel display screen about an axis which is substantially perpendicular to the flat panel display screen.

17. An adjustable mount according to claim 15, further comprising a locking device which is independent of the adjustment device and which is configured to secure the first and second components together while allowing for their relative positions to be altered by the adjustment device.

18. An adjustable mount according to claim 15 wherein the at least one screw comprises a pair of screws, and wherein each of the screws is engaged with a complementary screw thread of the one of the components and having its shank abutting or capable of abutting the other of the components, so that rotation of each of the screws can alter the relative horizontal positioning between the components in use.

19. An adjustable mount for mounting a flat panel display screen on a support comprising a first component adapted for securement to said support and forming a rear of the mount, a second component engaged with the first component and forming a front of the mount to which the screen is intended to be secured, in use, an adjustment device coupled with the first and second components and configured to alter the relative positioning therebetween; and a locking device to prevent the first and second components swinging apart, wherein the adjustment device comprises a pair of screws, wherein each of the pair of screws is engaged with a complementary screw thread of one of the components and having its shank abutting or capable of abutting the other of the components, so that rotation of each of the pair of screws can alter the roll of the flat panel display screen to provide horizontal leveling of the flat panel display screen when provided on the mount, wherein the locking device comprises at least one screw engaged with the second component having its shank received in a slot of the first component, and wherein the slot is elongated such that it enables adjustment of the relative positioning of the first and second components while said first and second components are secured together by the at least one screw of the locking device.

* * * * *